C. W. STARKER.
ROTOR FOR DYNAMO ELECTRIC MACHINES.
APPLICATION FILED AUG. 7, 1914.

1,286,138.

Patented Nov. 26, 1918.

WITNESSES:
Fred A. Lind
J. C. Davis

INVENTOR
Charles W. Starker
BY
Wesley G. Carr
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

ROTOR FOR DYNAMO-ELECTRIC MACHINES.

1,286,138.     Specification of Letters Patent.     Patented Nov. 26, 1918.

Application filed August 7, 1914. Serial No. 855,563.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Rotors for Dynamo-Electric Machines, of which the following is a specification.

My invention relates to dynamo-electric machinery and specifically to asynchronous machines wherein a short circuited secondary winding of the squirrel cage type is employed.

The object of my invention is to provide a winding of the character specified that may be cheaply and simply constructed and that will be rugged and efficient in operation, with effective heat dissipation.

In the manufacture of asynchronous machines of large capacity such, for example, as induction motors, frequency changers and phase converters, it is essential to provide a secondary winding which will have large current-carrying capacity, and which will also be able to withstand extremely high temperatures without damage. It is desirable to connect the conducting bars to the end rings of squirrel cage windings by means of solder of high melting point, such, for example, as silver or brass, preferably employing a contact electrical process for obtaining a welding heat. When it is attempted to employ these solders of high melting point with end rings of the massive construction necessary to give sufficient current-carrying capacity in apparatus of the character specified, it is found that the welding heat is conducted away so rapidly that it is difficult to make a satisfactory joint without burning the metal. Furthermore, with the large operating currents carried in end rings of the character specified, a great amount of heat is necessarily generated and considerable difficulty has been experienced in radiating this heat in a satisfactory manner. By my construction I am enabled to provide end rings of any desired capacity in a simple and expeditious manner, said end rings being so shaped that the welding heat is conserved and good air circulation through the ring may be had during operation.

Figure 1:
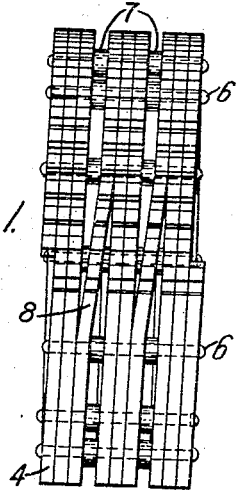
Figure 2:
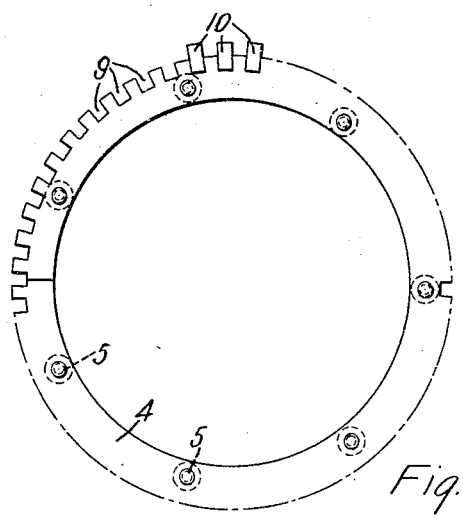
Figure 3:
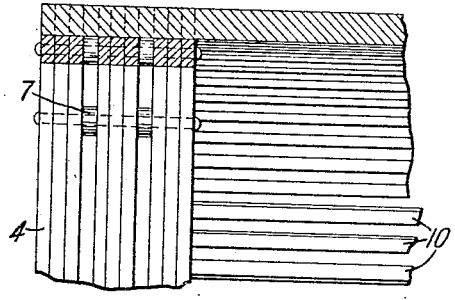

Referring to the accompanying drawing, Figure 1 is a side view, in elevation, of a partially finished end ring constructed in accordance with my invention; Fig. 2 is an end view, in elevation, of the ring shown in Fig. 1; and Fig. 3 is a side view, partially in section and partially in elevation, of a squirrel cage winding constructed in accordance with my invention.

In the manufacture of my device, a strip of conducting material 4, preferably copper, is wound edgewise to form a helix of any desired number of turns as, for example, nine. Suitable holes 5 are drilled longitudinally through the metal of the helix, and supporting means, such, for example, as rivets 6, are inserted in the holes 5. Between certain adjacent turns of the helix are mounted washers or other spacing means 7 in order to maintain the adjacent turns of the helix in a definite spaced relation. It is obvious that it is necessary for the conducting strip 4 to have its pitch increased between certain adjacent spacing means for a portion of the circumference, as shown at 8. After the spacing means 7 are all in place, the rivets 6 are headed over in order to render the entire structure rigid for subsequent operations. A plurality of longitudinal slots 9 are then machined in the outer surface of the helix, as shown clearly in Fig. 2, for the reception of the conducting bars 10, as shown in Figs. 2 and 3. The depth of these slots is preferably substantially one half the width of the strip 4. In assembling the squirrel cage, a conducting bar 10, of substantially the same width as the strip 4, is placed in one of the slots 9 and is soldered into each of the groups of turns in the helix formed from the strip 4. The operation is preferably performed by interposing a thin sheet of soldering material, such, for example, as silver, between the bar and the bottom and side walls of the slot, and passing a heavy electric current across the junction. The contact resistance generates sufficient heat to melt the soldering material, and a very intimate joint or weld is thus formed between the bar and all three walls of the slot. By proportioning the parts as shown, the thickness of the metal at the bottom and sides of the slot is substantially equal to the thickness of the portion of the bar embraced by the slot. As a result, there will be substantially equal heating of both members, and, consequently, a very accurate control of the soldering temperature may be had. I desire to call particular attention to the large area of soldered surface, including both the sides and bottom of the slots, whereby the bars are held firmly in position, and a joint of great current carrying capacity is formed.

In operation, the entire end ring projects beyond the end of the secondary core so that the atmosphere has free access to the circumferential openings caused by the spacing members 7. In this manner, the heat generated in the end rings during operation is effectively dissipated.

Obviously, my invention is capable of various modifications, such as causing the conducting bars 10 to project through holes in the body of the helix or to embed them in slots in the inner surface of said helix, but I consider my invention sufficiently broad to cover all of these modifications, and I desire that only such restrictions shall be placed thereupon as are set forth in the appended claims.

I claim as my invention:

1. In a winding for dynamo-electric machines comprising a plurality of conductor bars, an end ring comprising a helically edge-wound strip of conducting material, axially extending members independent of said conductor bars for maintaining the turns of said helix in concentric relation, and means carried by said members for maintaining certain adjacent turns of said helix in spaced relation to each other.

2. In a winding for dynamo-electric machines, an end ring comprising a helically edge wound strip of conducting material, said end ring being provided with axially extending rods for maintaining the turns of said helix in concentric relation, and washers carried thereby for maintaining certain adjacent turns of said helix in spaced relation to each other.

3. In a winding for dynamo-electric machines, an end ring comprising a helically edge wound strip of conducting material, supporting rods of suitable material disposed parallel to the longitudinal axis of said helix and projecting through the body of a plurality of turns of said strip, and washers mounted upon certain of said supporting rods between certain of the turns of said helix, whereby said turns are maintained in a spaced relation with respect to each other.

In testimony whereof, I have hereunto subscribed my name this 29th day of July, 1914.

CHARLES W. STARKER.

Witnesses:
GEORGE J. SCHMIDT,
B. B. HINES.

Copies of this patent may be obtained for five cents each by addressing the "Commissioner of Patents, Washington, D. C."